May 24, 1966
J. H. STANLEY
3,252,172
COMBINED THREADING AND FACING TOOL
Filed Jan. 28, 1963
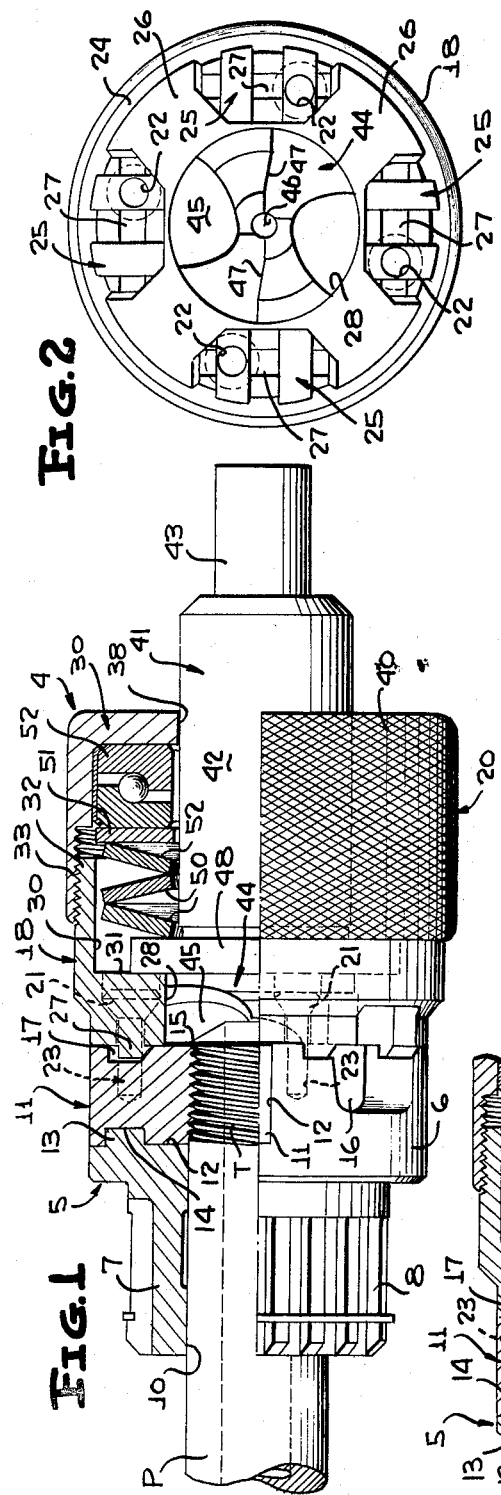
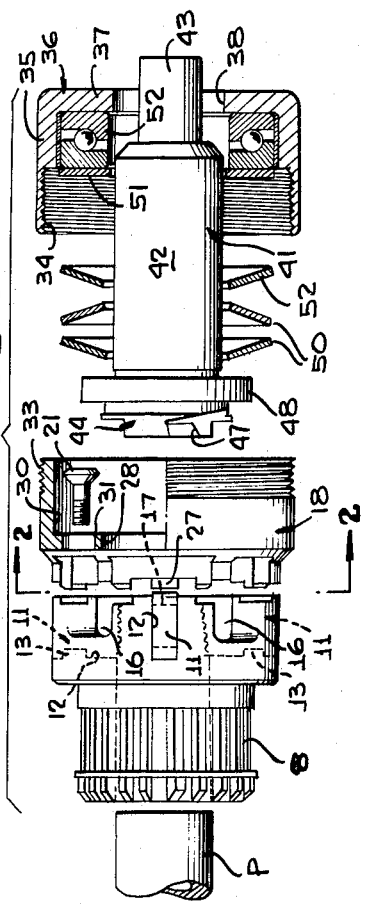
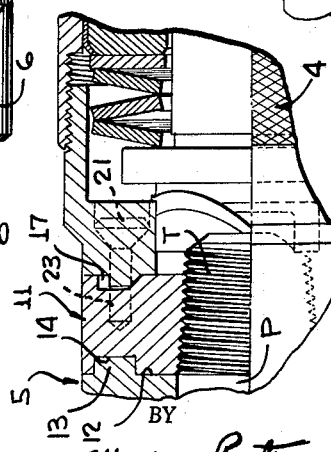
INVENTOR
JOHN H. STANLEY
BY Mason, Porter, Diller & Stewart
ATTORNEYS United States Patent Office 3,252,172
Patented May 24, 1966

3,252,172
COMBINED THREADING AND FACING TOOL
John H. Stanley, Euclid, Ohio, assignor to Parker-Hannifin Corporation, Cleveland, Ohio, a corporation of Ohio
Filed Jan. 28, 1963, Ser. No. 254,087
13 Claims. (Cl. 10—109)

This invention relates to a novel combined threading and facing tool which repeatedly cuts an identical predetermined length of thread and faces a free peripheral end wall of a pipe each time the combined threading and facing tool is used.

An object of this invention is to provide a novel combined threading and facing tool including a ratcheted die head having an axial bore, a housing rotatably and reciprocally carrying a cutting tool secured to the die head, and means in the housing operatively associated with the cutting tool for facing a free peripheral edge of a pipe a predetermined distance from a last thread portion formed on an end portion of the pipe when the cutting tool is reciprocated and rotated in the housing.

Another object of this invention is the provision of a novel combined threading and facing tool including a ratcheted die head having an axial bore therein, chasers carried by the die head, a housing secured to the die head in axial alignment with the axial bore, a cutting tool rotatably and reciprocally mounted in the housing, the cutting tool including a cutting face directed toward the die head, and first means in the housing cooperative with second means on the cutting tool for limiting the reciprocal movement of the cutting tool with respect to the housing for repeatedly cutting an identical predetermined length of thread on an end portion of a pipe.

Still another object of this invention is the provision of a novel combined threading and facing tool of the type having a ratcheted die head, a plurality of chasers carried by the die head, a housing secured to the die head and rotatably journalling a cutting tool therein, and in addition, to provide a first abutment member in the housing and a second abutment member on the cutting tool for accurately positioning the cutting tool with respect to the die head to enable the formation of an identical predetermined length of thread each time the combined threading and facing tool is used.

Still another object of this invention is to provide a novel combined threading and facing tool of the character immediately above described, and further providing a biasing mechanism in the housing for normally urging the cutting tool and the die head into a predetermined relationship.

A further object of this invention is the provision of a novel combined threading and facing tool including a die head having an axial bore, a plurality of chasers carried by the die head adapted to cut a left-hand tapered thread on the exterior end portion of a pipe positioned within the axial bore, a housing secured to the die head, a cutting tool rotatable in the housing, the cutting tool including a cutting face directed toward the axial bore, and a circumferential abutment wall in the housing cooperative with a peripheral shoulder on the cutting tool for maintaining a predetermined axial relationship between the cutting head and the die head.

Still another object of this invention is to provide a novel combined threading and facing tool of the type heretobefore mentioned, and including a biasing mechanism located in the housing between the peripheral shoulder of the cutting tool and an end wall of the housing spaced from the abutment wall thereof for constantly urging the cutting tool and the die head into an exact predetermined axial relationship.

Another object of this invention is to provide a novel method of threading and facing a pipe by cutting threads along a length of the pipe while advancing the pipe against an axial force, and facing a portion of the threaded pipe from the direction of the axial force.

With the above, and other objects in view that will hereinafter appear, the nature of the invention will be more clearly understood by reference to the following detailed description, the appended claims and the several views illustrated in the accompanying drawings.

In the drawings:

FIGURE 1 is a side elevational view with parts broken away and shown in section of a combined threading and facing tool constructed in accordance with this invention, and shows a ratcheted die head secured to a housing, a cutting tool reciprocally and rotatably mounted in the housing, and a biasing mechanism within the housing urging a portion of the cutting tool against a wall of the housing.

FIGURE 2 is an enlarged end elevational view taken along line 2—2 of FIGURE 3, and shows a forward face of the housing and a cutting face of the cutting tool.

FIGURE 3 is a reduced exploded side elevational view with parts shown in section of the combined threading and facing tool of FIGURE 1, and more clearly illustrates the various components thereof.

FIGURE 4 is a fragmentary side elevational view with parts shown in section of a portion of the combined threading and facing tool of FIGURE 1, and illustrates a threaded conduit in abutment with the cutting face of the facing tool prior to the rotation of the facing tool to cut a face in a free peripheral end wall of the pipe.

Referring to the drawing in detail, a combined threading and facing tool constructed in accordance with this invention is generally designated by the reference numeral 4. The combined threading and facing tool 4 includes a die head 5 having a main body portion 6 and a reduced end portion 7. The reduced end portion 7 of the die head 5 is provided with a plurality of ratchet teeth 8 for rotating the die head 5 in a known manner by a conventional tool. The combined threading and facing tool 4 has an axial bore 10 into which a pipe or conduit P is slidably received.

Four chasers 11 are each received in one of four radial slots 12 spaced equally about the circumference of the main body portion 6 of the die head 5. An axial projection 13 projects into each of the radial slots 12 and is received in a complementary groove 14 of each of the chasers 11 to accurately locate the chasers 11 with respect to the die head 5. A cutting face 15 of each of the chasers 11 cuts a tapered thread T upon the pipe or conduit P whenever the threading and facing tool 5 is operated in a manner to be hereafter described. A plurality of radial openings 16 in the main body portion 6 of the die head 5 permits metal which is removed from the pipe P during the thread-cutting operation to be removed from the interior of the die head 5 in a known manner. A lug-receiving groove 17 is formed in each of the chasers 11 for a purpose to be hereafter discussed.

A shell 18 of a two-piece housing 20 is secured to the die head 5 by a plurality of screws 21, each of the screws passing freely through an associated opening 22 in the shell 18 and threadedly received in a threaded aperture 23 in the main body portion 6 of the die head 5.

As is best illustrated in FIGURES 1 and 2 of the drawings, the shell 18 of the two-piece housing 20 has a front face 24 directed toward the main body portion 6 of the die head 5. The front face 24 includes four identical lug bodies 25 spaced from each other by one of a plurality of radial grooves 26. Each of the lug bodies 25 has an axially projecting central lug 27 which is received in a respective one of the lug-receiving grooves 17 in the plurality of chasers 11, in a manner best illustrated in FIGURE 1 of the drawings. These axially projecting central lugs 27 on the lug bodies 25 contact the inner axial walls defining the lug-receiving grooves 17 in the chasers 11 to limit the radial outward position of the chasers 11 with respect to the die head 5 and thereby control the diameter of the thread T formed on the pipe P during the threading operation.

The shell 18 is bored at 28 and counterbored at 30 to define an integral annular abutment wall 31. A peripheral skirt 32 of the shell 18 is threaded at 33 to threadably receive a complementary threaded portion 34 in the interior of a skirt 35 of a second shell 36.

The second shell 36 includes an end wall 37 having an axial aperture 38 and a knurled peripheral skirt portion 40. The shell 18 and the second shell 36 comprise the two-piece housing 20 and the threaded portions 33 and 34 thereof permit the two-piece housing 20 to be readily assembled and disassembled.

A cutting tool 41 is reciprocally and rotatably mounted in the two-piece housing 20 of the threading and facing tool 4. The cutting tool 41 includes a main cylindrical body 42 projecting outwardly through the axial aperture 38 in the end wall 37 of the second shell 36. An integral end portion 43 of the main cylindrical body 42 serves as a drive connection for a rotating tool (not illustrated) whereby the cutting tool 41 may be rotated.

The end of the cutting tool 41 opposite the end portion 43 is provided with a cutting head 44 positioned in the bore 28 of the shell 18. As is best illustrated in FIGURE 2 of the drawings, the cutting head 44 has a cutting face 45 with an axial centering bore 46 therein. The cutting face 45 has two cutting edges 47 spaced 180° apart and have a 30° cutting angle.

An integral peripheral abutment shoulder 48 of the cutting tool 41 cooperates with the annular abutment wall 31 of the shell 18 to maintain a predetermined axial relationship between the cutting tool 41 and the axial bore 10 of the die head 5. This axial alignment is necessary because the thread T formed on the pipe P is tapered and not straight. The integral peripheral abutment shoulder 48 also cooperates with the annular abutment wall 31 of the shell 18 to limit the distance the cutting head 44 of the cutting tool 41 can be reciprocated in the bore 28 of the shell 18 for a purpose to be hereafter described.

The peripheral abutment shoulder 48 of the cutting tool 41 is normally maintained in abutment with the annular abutment wall 31 of the shell 18 by a plurality of Belleville washers 50 surrounding the main cylindrical body 42 of the cutting tool 41, and positioned between the peripheral abutment shoulder 48 and an annular spacer 51, similarly encompassing the cylindrical body 42 of the cutting tool 41. An anti-friction bearing 52 is positioned between the annular spacer 51 and the end wall 37 of the second shell 35 to facilitate frictionless rotation of the cutting tool 41.

The operation of the combined threading and facing tool 4 will be best understod by referring to FIGURES 1 and 4 of the drawing to which attention is now directed.

The pipe P prior to being threaded and faced is first held stationary in a suitable vice (not shown) or any such other suitable mechanism. The unthreaded and unfaced pipe P is then introduced into the axial bore 10 of the die head 5 until an end portion thereof is adjacent the plurality of chasers 11. The die head 5 is rotated in a conventional manner by the ratcheted end portion thereof. As the died head 5 is rotated the plurality of chasers 11 cut a left-hand tapered thread T on the pipe P. As the threads T are being cut, the die head 5 is drawn from right to left as viewed in FIGURE 1 of the drawings thereby drawing the cutting face 45 of the cutting tool 41 toward the pipe P. It should be particularly noted that the entire threading and facing tool 4 rotates as the die head 5 rotates, including the cutting tool 41.

When the threaded end portion of the pipe P contacts the cutting face 45 of the cutting tool 41, the rotation of the cutting tool 41 is stopped because the cutting edges 47 of the cutting face 45 dig into the pipe P. This signals the operator that contact has been made between the pipe P and the cutting face 45 of the cutting tool 41.

The die head 5 is still rotated causing the pipe P to move the cutting tool 41 from left to right as viewed in FIGURE 1 until the washers 50 are compressed between the annular peripheral abutment shoulder 48 and the annular spacer 51 as shown in FIGURE 4. In the FIGURE 4 position the cutting head 44 is spaced from the plurality of chasers 11 and the peripheral abutment shoulder 48 is spaced from the annular abutment wall 31 of the shell 18.

A rotating tool (not shown) is then connected to the end drive portion 43 of the cutting tool 41 to rotate the same whereby the cutting edges 47 of the cutting tool 41 cut a 30° face on the pipe P. During this cutting operation, the cutting tool 41 moves from right to left in FIGURE 1 until the peripheral abutment shoulder 48 contacts the annular abutment wall 31 of the shell 18 at which time further advancement of the cutting tool 41 with respect to the pipe P is precluded. Because of the abutment between the annular abutment wall 31 and the peripheral abutment shoulder 48 any one of a plurality of pipes may be provided with an identical length of thread and an identical face portion by the combined threading and facing tool 4.

While the operation of the combined threading and facing tool 4 has been described in a manner which permits an operator to thread and face a pipe in two steps, namely, rotating the die head 5 until the pipe is threaded, then rotating the cutting tool until the pipe is faced, other ways of operating the combined threading and facing tool 4 are possible. For example, the die head 5 can be rotated until the cutting face 45 is spaced from the plurality of chasers 11 a distance less than the spacing illustrating in FIGURE 4, after which the cutting tool 41 is rotated. Upon the completion of the rotation of the cutting tool 41, the pipe P will only be partially faced and the die head 5 and the cutting tool 41 must again be alternately operated to complete the facing of the pipe P.

While one form of the combined threading and facing tool has been shown herein for purposes of illustration, it is to be understood that various changes in the details of construction and arrangement of parts thereof may be made without departing from the spirit and scope of this invention as defined by the appended claims.

I claim:

1. A combined threading and facing tool comprising a die head having an axial bore, a plurality of chasers carried by said die head adapted to cut a thread on an end portion of a pipe positioned within said axial bore, a housing secured to the die head in axial alignment with the axial bore, a cutting tool rotatably and reciprocally mounted in said housing, said cutting tool including a cutting face directed toward said axial bore whereby a free peripheral end wall of a pipe within the axial bore is faced-off upon the reciprocation and rotation of the cutting tool, a circumferential abutment wall in said housing and a peripheral shoulder on said cutting tool whereby reciprocal advancement of said cutting tool toward said axial bore is stopped by the contact of the peripheral shoulder against the abutment wall.

2. The combined threading and facing tool as defined in claim 1 wherein a biasing mechanism is located in said housing between said peripheral shoulder and an end wall of the housing spaced from the abutment wall thereof.

3. The combined threading and facing tool as defined in claim 1 wherein an anti-friction bearing element is positioned between said housing and said cutting tool to facilitate the rotation of the cutting tool during a facing operation.

4. The combined threading and facing tool as defined in claim 1 wherein the die head is provided with a ratchet mechanism and the cutting tool includes a drive portion projecting outwardly of said housing.

5. The combined threading and facing tool as defined in claim 1 wherein a biasing mechanism is located in said housing between said peripheral shoulder and an end wall of the housing spaced from the abutment wall thereof, and said housing being a two-part structure whereby said cutting tool is readily removable and replaceable within the housing.

6. A combined threading and facing tool comprising a die head having an axial bore, a plurality of chasers carried by said die head adapted to cut a thread on an end portion of a pipe positioned within said axial bore, a housing secured to the die head in axial alignment with the axial bore, a cutting tool rotatably and reciprocally mounted in said housing, said cutting tool including a cutting face directed toward said axial bore whereby a free peripheral end wall of a pipe within the axial bore is faced-off upon the reciprocation and rotation of the cutting tool, a circumferential abutment wall in said housing and a peripheral shoulder on said cutting tool whereby reciprocal advancement of said cutting tool toward said axial bore is stopped by the contact of the peripheral shoulder against the abutment wall, and said cutting face having a cutting edge in angular relationship to the axis of said axial bore whereby said pipe is angularly faced-off at the free peripheral end wall thereof.

7. A combined threading and facing tool comprising a ratcheted die head, an axial bore in said die head, a plurality of chasers projecting into said axial bore, a two-part housing secured to said die head, a first part of said housing having an integral annular abutment wall, a second part of said housing having an end wall axially spaced from said abutment wall, a cutting tool reciprocally and rotatably carried by said housing, said cutting tool including a cutting head positioned in the first part of said housing and a drive portion projecting outwardly through an aperture in said end wall, an integral peripheral abutment shoulder on said cutting tool between the cutting head and the drive portion thereof, an annular spacer surrounding said cutting tool within the housing between the end wall and the peripheral abutment shoulder, an anti-friction bearing element between the spacer and the end wall, and spring means between said spacer and the peripheral abutment shoulder.

8. A combined threading and facing tool comprising a die head, an axial bore in said die head, a plurality of chasers projecting into said axial bore, a housing secured to said die head, a first portion of said housing having an integral annular abutment wall, a second portion of said housing having an end wall axially spaced from said abutment wall, a cutting tool reciprocally and rotatably carried by said housing, said cutting tool including a cutting head positioned in the first portion of said housing and a drive portion projecting outwardly of said housing, an integral peripheral abutment shoulder on said cutting tool between the cutting head and the drive portion thereof, an anti-friction bearing element, and spring means between said anti-friction bearing element and the peripheral abutment shoulder.

9. A combined threading and facing tool comprising a die head, an axial bore in said die head, a plurality of chasers projecting into said axial bore, a housing secured to said die head, said housing defining a bore in axial alignment with and forming an extension of the axial bore of said die head, said housing including first and second axially spaced portions, the first portion of said housing being positioned more closely adjacent the axial bore of said die head and including abutment means, the second portion of said housing including an end wall axially spaced from said abutment means, a cutting tool reciprocably and rotatably mounted in the bore of said housing, said cutting tool including a cutting head normally positioned adjacent said chasers in a first position thereof and reciprocal to a second position more closely adjacent said end wall, said cutting tool including a drive portion projecting outwardly through said housing whereby said cutting tool can be rotated, abutment means on said cutting tool between the cutting head and the drive portion thereof, said cutting means of the cutting tool normally contacting the abutment means of said housing in the first position of the cutting tool, and biasing means between the abutment means of the cutting tool and the end wall of the housing for normally maintaining the abutment between the abutting means prior to a thread cutting operation and biasingly resisting movement of the cutting head toward the end wall during a thread cutting operation.

10. The combined threading and facing tool as defined in claim 9 including means for rotating both the die head and housing during a thread cutting operation.

11. A combined threading and facing tool comprising a die head having an axial bore, chaser means carried by said die head adapted to cut threads on an end portion of a pipe positioned within said axial bore, a housing in axial alignment with the axial bore, said housing having an end wall spaced from said chaser means, first abutment means between said chaser means and said end wall, a cutting tool mounted for rotation and reciprocation relative to said die head, second abutment means carried by said cutting tool and cooperative with the first abutment means for limiting the reciprocal advancement of said cutting tool from a first position adjacent said end wall to a second position remote from said end wall at which said abutment means are in abutment, means urging said abutment means toward said second position, said abutment means being normally in abutment prior to the operation of said tool, and said cutting tool including a cutting face directed toward said axial bore whereby a free peripheral end portion of a pipe within the axial bore is faced upon the rotation of said cutting tool and the reciprocation thereof toward said second position.

12. A combined threading and facing tool comprising a die head having an axial bore, chaser means carried by said die head adapted to cut threads on an end portion of a pipe positioned within said axial bore, a housing in axial alignment with the axial bore, said housing having an end wall spaced from said chaser means, first abutment means between said chaser means and said end wall, a cutting tool mounted for rotation and reciprocation relative to said die head, second abutment means carried by said cutting tool and cooperative with the first abutment means for limiting the reciprocal advancement of said cutting tool from a first position adjacent said end wall to a second position remote from said end wall at which said abutment means are in abutment, means urging said abutment means toward said second position, said urging means being spring means, said abutment means being normally in abutment prior to the operation of said tool, and said cutting tool including a cutting face directed toward said axial bore whereby a free peripheral end portion of a pipe within the axial bore is faced upon the rotation of said cutting tool and the reciprocation thereof toward said second position.

13. A combined threading and facing tool comprising a die head having an axial bore, chaser means carried by said die head adapted to cut threads on an end portion of a pipe positioned within said axial bore, a housing in axial alignment with the axial bore, said housing having an end wall spaced from said chaser means, first abutment means between said chaser means and said end wall, a cutting tool mounted for rotation and reciprocation relative to said die head, second abutment means carried by said cutting tool and cooperative with the first abutment means for limiting the reciprocal advancement of said cutting tool from a first position adjacent said end wall to a second position remote from said end wall at which said abutment means are in abutment, means urging said abutment means toward said second position, said abutment means being normally in abutment prior to the operation of said tool, means for rotating said chaser means relative to the end portion of a pipe in said axial bore, said cutting tool including a drive portion for rotating said cutting tool, and said cutting tool including a cutting face directed toward said axial bore whereby a free peripheral end portion of a pipe within the axial bore is faced upon the rotation of said cutting tool and the reciprocation thereof toward said second position.

References Cited by the Examiner

UNITED STATES PATENTS

| | | | |
|---|---|---|---|
| 712,445 | 10/1902 | Thompson | 10—112 |
| 780,017 | 1/1905 | Albee | 10—87 |
| 1,038,913 | 9/1912 | Long | 77—73 |
| 1,134,322 | 4/1915 | Estell | 10—120.5 |
| 1,338,083 | 4/1920 | Ibach | 10—1 |
| 1,610,198 | 12/1926 | Burch | 10—87 |
| 1,647,037 | 10/1927 | Duchesne | 10—1 |
| 1,999,816 | 4/1935 | Lindenmuth et al. | 10—1 |
| 2,246,237 | 6/1941 | Benninghoff | 10—120.5 |
| 2,767,412 | 10/1956 | Berkey | 10—140 |
| 2,968,822 | 1/1961 | Coblitz | 10—87 |

ANDREW R. JUHASZ, *Primary Examiner.*